US012809224B2

(12) United States Patent
Takagi et al.

(10) Patent No.: US 12,809,224 B2
(45) Date of Patent: Nov. 24, 2026

(54) OPTICAL COUPLER, OPTICAL COUPLING MEMBER, VISIBLE LIGHT SOURCE MODULE, AND OPTICAL ENGINE

(71) Applicant: TDK CORPORATION, Tokyo (JP)

(72) Inventors: Yasuhiro Takagi, Tokyo (JP); Makoto Fukuda, Tokyo (JP); Takeshi Kamono, Tokyo (JP)

(73) Assignee: TDK CORPORATION, Tokyo (JP)

( * ) Notice: Subject to any disclaimer, the term of this patent is extended or adjusted under 35 U.S.C. 154(b) by 322 days.

(21) Appl. No.: 18/754,296

(22) Filed: Jun. 26, 2024

(65) Prior Publication Data

US 2025/0004349 A1 Jan. 2, 2025

(30) Foreign Application Priority Data

Jun. 28, 2023 (JP) ................................ 2023-106471

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01); *G02F 2202/20* (2013.01)

(58) Field of Classification Search
None
See application file for complete search history.

(56) References Cited

U.S. PATENT DOCUMENTS

| | | | | |
|---|---|---|---|---|
| 6,996,302 | B2 * | 2/2006 | Hamada | G02F 1/313 398/79 |
| 11,657,845 | B1 * | 5/2023 | Shi | G11B 13/08 369/13.33 |
| 2004/0067020 | A1 * | 4/2004 | Betty | B82Y 20/00 385/39 |
| 2004/0105677 | A1 * | 6/2004 | Hamada | G02F 1/313 398/79 |
| 2004/0170351 | A1 * | 9/2004 | Fishman | G02F 1/3136 385/39 |
| 2005/0201675 | A1 * | 9/2005 | Knopp | G02B 6/4213 385/27 |
| 2016/0357086 | A1 * | 12/2016 | Jewart | G02B 6/125 |
| 2017/0052423 | A1 | 2/2017 | Okamoto | |

(Continued)

FOREIGN PATENT DOCUMENTS

| | | | |
|---|---|---|---|
| JP | 2012-048071 | A | 3/2012 |
| JP | 6572377 | B2 | 9/2019 |

(Continued)

*Primary Examiner* — Jerry Rahll
(74) *Attorney, Agent, or Firm* — Oliff PLC

(57) ABSTRACT

An optical coupler of the present disclosure includes a plurality of one-input multiple-output multimode interference input parts provided for each laser beam of the plurality of laser light beams. The optical coupler further includes one light output port configured to allow three laser light beams to be coupled and emitted therethrough, a plurality of light input side optical waveguides configured to extend from each of the plurality of one-input multiple-output multimode interference input parts, a light output side optical waveguide configured to extend from the light output port, and an optical coupling part configured to have the plurality of light input side optical waveguides and the light output side optical waveguide connected thereto.

10 Claims, 9 Drawing Sheets

(56) References Cited

U.S. PATENT DOCUMENTS

| | | | |
|---|---|---|---|
| 2019/0056552 A1 | 2/2019 | Sakamoto et al. | |
| 2019/0146302 A1 | 5/2019 | Iwatsuka et al. | |
| 2021/0165163 A1 | 6/2021 | Sakamoto et al. | |
| 2024/0126015 A1* | 4/2024 | Utsunomiya ...... | G02B 27/1006 |

FOREIGN PATENT DOCUMENTS

| | | | |
|---|---|---|---|
| JP | 2020-027170 | A | 2/2020 |
| JP | 6728596 | B2 | 7/2020 |
| JP | 6787397 | B2 | 11/2020 |

* cited by examiner

OPTICAL COUPLER, OPTICAL COUPLING MEMBER, VISIBLE LIGHT SOURCE MODULE, AND OPTICAL ENGINE

CROSS-REFERENCE TO RELATED APPLICATION

Priority is claimed on Japanese Patent Application No. 2023-106471, filed Jun. 28, 2023, the content of which is incorporated herein by reference.

BACKGROUND OF THE INVENTION

Field of the Invention

The present disclosure relates to an optical coupler, an optical coupling member, a visible light source module, and an optical engine.

Description of Related Art

Currently, glasses-type terminals are being studied in XR technologies such as virtual reality (VR) and augmented reality (AR). Particularly, in recent years, retinal scanning displays allowing a user to visually recognize images by forming images of light used for two-dimensional scanning on the user's retina have attracted attention. In retinal scanning displays, generally, three-color visible light emitted from light sources such as light emitting diodes (LEDs) or laser diodes (LDs) respectively corresponding to colors of R (red), G (green), and B (blue) are coupled on one optical axis. The coupled three-color visible light are transmitted to an image display part. The image display part performs two-dimensional scanning of transmitted light and causes it to be incident on the user's pupil. An image of this incident light is formed on the user's retina so that the user visually recognizes the image. In this case, the retina serves as a screen displaying images.

For example, Patent Document 1 discloses a constitution of a retinal projection display using a Mach-Zehnder optical modulator.

PATENT DOCUMENTS

[Patent Document 1] Japanese Patent No. 6728596
[Patent Document 2] Japanese Patent No. 6787397
[Patent Document 3] Japanese Patent No. 6572377
[Patent Document 4] Japanese Unexamined Patent Application, First Publication No. 2012-48071
[Patent Document 5] Japanese Unexamined Patent Application, First Publication No. 2020-27170

SUMMARY OF THE INVENTION

In the retinal projection display disclosed in Patent Document 1, a plurality of optical waveguides are close to each other in an emission portion, but coupling is not performed, and therefore an optical axis of each wavelength varies so that control of emission light becomes complicated.

In addition, Patent Document 2 discloses a visible light modulator using a lithium niobate film. There is a demand for RGB optical couplers that can be connected to or integrated with a visible light modulator using a lithium niobate film, but this has not yet been studied.

Regarding coupling of visible light, directional couplers are generally being studied (for example, refer to Patent Document 3). These are constituted using a glass-based material and have excellent stability. However, when a lithium niobate substrate having a significant $\Delta n$ is used, a coupling length increases so that miniaturization cannot be achieved.

Patent Document 4 and Patent Document 5 disclose constitutions of RGB couplers using a multimode interferometer (MMI), and both are made of a glass-based material. However, neither of them discloses a constitution using a lithium niobate film.

In an MMI optical coupler, a plurality of input signals are input using a plurality of waveguide ports on a light input side, a single waveguide port is used for an output signal on a light output side, and all input signals are coupled and output as an output signal.

As of now, optical couplers that can cope with a high output have not yet been studied.

An object of the present disclosure is to provide an optical coupler that can be connected to or integrated with an optical modulator using a lithium niobate film and can cope with a high output, an optical coupling member including the same, a visible light source module, and an optical engine.

In order to resolve the foregoing problems, the present disclosure provides the following means.

According to Aspect 1 of the present disclosure is an optical coupler for coupling a plurality of laser light beams having different wavelengths. The optical coupler includes a plurality of one-input multiple-output multimode interference input parts provided for each laser beam of the plurality of laser light beams as an optical input part of the laser beams. The optical coupler further includes a light output port configured to allow the plurality of laser light beams to be coupled and emitted therethrough, a plurality of light input side optical waveguides configured to extend from each of the plurality of one-input multiple-output multimode interference input parts, a light output side optical waveguide configured to extend from the light output port, and an optical coupling part configured to have the plurality of light input side optical waveguides and the light output side optical waveguide connected thereto.

According to Aspect 2 of the present disclosure, the optical coupler according to Aspect 1 includes a plurality of light output ports as the light output port, and a plurality of light output side optical waveguides respectively connected to the plurality of light output ports.

According to Aspect 3 of the present disclosure, in the optical coupler according to Aspect 2, in the plurality of light output ports, an interval between light output ports farthest away from each other is 25 μm or smaller.

According to Aspect 4 of the present disclosure, in the optical coupler according to any one of Aspects 1 to 3, the optical coupling part is a multimode-interference-type optical coupling part.

Aspect 5 of the present disclosure is an optical coupling member that includes a substrate configured to be made of a material different from lithium niobate, and an optical coupling function layer configured to be formed on a main surface of the substrate and be constituted of a lithium niobate film. The optical coupler according to any one of Aspects 1 to 4 is formed in the optical coupling function layer.

Aspect 6 of the present disclosure is a visible light source module that includes the optical coupling member according to Aspect 5, and a plurality of visible laser light sources configured to emit visible light lasers coupled by the optical coupling member.

Aspect 7 of the present disclosure is an optical coupling member with an optical modulation function that includes a Mach-Zehnder optical modulator configured to be provided inside the optical coupling function layer of the optical coupling member according to Aspect 5.

Aspect 8 of the present disclosure is a visible light source module that includes the optical coupling member with an optical modulation function according to Aspect 7, and a plurality of visible laser light sources configured to emit visible light lasers coupled by the optical coupling member with an optical modulation function.

Aspect 9 of the present disclosure is an optical engine that includes the visible light source module according to Aspect 6, and a light scanning mirror configured to reflect light emitted from the visible light source module at various angles for image display.

Aspect 10 of the present disclosure is an optical engine that includes the visible light source module according to Aspect 8, and a light scanning mirror configured to reflect light emitted from the visible light source module at various angles for image display.

According to the present disclosure, it is possible to provide an optical coupler that can be connected to or integrated with an optical modulator using a lithium niobate film and can cope with a high output.

DETAILED DESCRIPTION OF THE INVENTION

Figure 1:
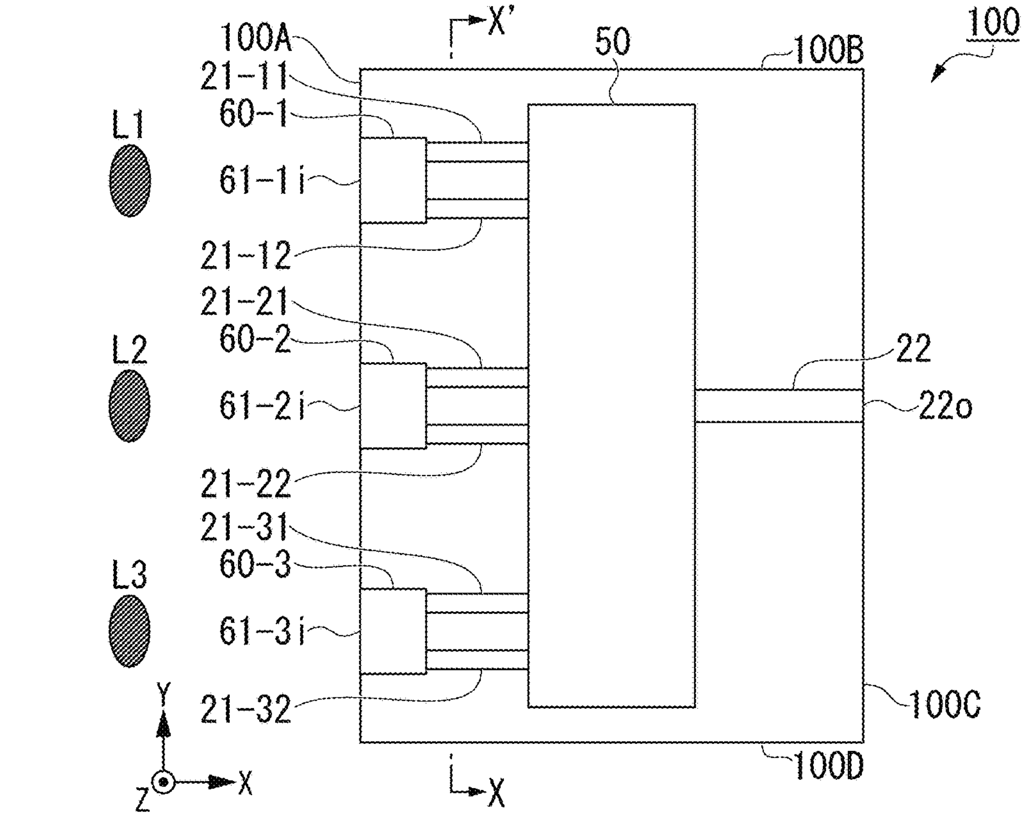
FIG. 1 is a schematic plan view showing an optical coupler according to a first embodiment.

Hereinafter, embodiments will be described in detail suitably with reference to the diagrams. In the drawings used in the following description, in order to make characteristics easy to understand, characteristic portions may be illustrated in an enlarged manner for the sake of convenience, and dimensional ratios or the like of each constituent element may differ from actual values thereof. Materials, dimensions, and the like illustrated in the following description are merely exemplary examples. The present disclosure is not limited thereto and can be suitably changed and performed within a range in which the effects of the present disclosure are exhibited.

Optical Coupler (First Embodiment)

FIG. 1 is a schematic plan view showing an optical coupler according to a first embodiment. The reference signs L1, L2, and L3 in the diagrams conceptually indicate three laser light beams.

An optical coupler 100 shown in FIG. 1 is an optical coupler for coupling the three laser light beams L1, L2, and L3 having different wavelengths and includes one-input multiple-output multimode interference input parts 60-1, 60-2, and 60-3 provided for each laser beam of the plurality of laser light beams. The optical coupler 100 further includes one light output port 220 allowing three laser light beams to be coupled and emitted therethrough, six light input side optical waveguides 21-11, 21-12, 21-21, 21-22, 21-31, and 21-32 in total extending by two from each of the multimode interference input parts 60-1, 60-2, and 60-3, a light output side optical waveguide 22 extending from the light output port 220, and an optical coupling part 50 having the six light input side optical waveguides 21-11, 21-12, 21-21, 21-22, 21-31, and 21-32 and the light output side optical waveguide 22 connected thereto.

In FIG. 1, an X direction is a direction orthogonal to a side surface 100A on which light input ports are disposed, a Y direction is a direction orthogonal to the X direction, and a Z direction is a direction orthogonal to a plane formed in the X direction and the Y direction.

The optical coupler 100 is constituted to guide light to the optical coupling part 50 using two optical waveguides for each of laser light beams. That is, the laser light L1 is received by a light input port 61-1*i* of the multimode interference (MMI) input part 60-1 and is guided to the optical coupling part 50 using the two light input side optical waveguides 21-11 and 21-12. In addition, the laser light L2 is received by a light input port 61-2*i* of the multimode interference (MMI) input part 60-2 and is guided to the optical coupling part 50 using the two light input side optical waveguides 21-21 and 21-22. The laser light L3 is received by a light input port 61-3*i* of the multimode interference (MMI) input part 60-3 and is guided to the optical coupling part 50 using the two light input side optical waveguides 21-31 and 21-32.

In this manner, by providing a plurality of light input side optical waveguides for guiding light to the optical coupling part 50, the power density of laser light guided through the optical waveguides can be dispersed so that damage to the optical waveguides can be curbed. Particularly, this is an effective countermeasure against damage to the optical waveguides caused by high-output lasers (for example, laser light of 100 mW or higher, or the like).

As an example of dimensions of the light input side optical waveguides and the light output side optical waveguides, the width can be 0.1 to 5 μm and the height can be 0.1 to 5 μm.

The optical coupler 100 is constituted to be able to cope with a case in which three laser light beams having different wavelengths are input, but the constitution is not limited for three laser light beams having different wavelengths, and it can be constituted for two laser light beams having different wavelengths. It can have a constitution in which the number of light input ports and the number of light input side optical waveguides leading to the light input ports are changed in accordance with the number of laser light beams.

Input laser light beams having different wavelengths can be visible light beams, but they are not limited to visible light. It may be constituted to be used for visible laser light beams and laser light other beams than visible light beams.

The optical coupler 100 has four side surfaces 100A, 100B, 100C, and 100D and is constituted to have the three light input ports provided on the first side surface 100A and the light output port provided on the third side surface 100C, but it can also be constituted to have the light output port provided on the second side surface 100B or the fourth side surface 100D.

The optical coupling part 50 is a multimode interference (MMI) coupler. However, a directional coupler or a Y-shaped coupler may also be used. The optical coupling part 50 is a six-input one-output type MMI coupler, but it is not limited to the six-input one-output type. An MMI coupler of a multiple-input one-output type or a multiple-input multiple-output type can be used.

By using a multimode interference (MMI) coupler as the optical coupling part 50, coupling efficiency in coupling can be improved.

In the optical coupler 100, the MMI optical coupling part 50 is constituted of one stage, but it may be constituted of two or more stages.

It is preferable that the light input side optical waveguides and the light output side optical waveguides connected to the optical coupling part 50 (MMI coupler) include tapered portions which become wider toward the corresponding input and output ports of the optical coupling part 50. The light input side optical waveguides and the light output side optical waveguides connected to the optical coupling part 50 are set such that single-mode laser light (zero-order mode, basic mode) is propagated, and the optical coupling part 50 is set such that multimode laser light (zero-order mode to higher-order mode) is propagated. For this reason, when light is input to the optical coupling part 50 from the light input side optical waveguides and is output to the light output side optical waveguides from the optical coupling part 50, a coupling loss will occur due to mode inconsistency between the single mode and the multimode of incident light. In contrast, if tapered portions are provided in the input and output ports, mode inconsistency between the single mode and the multimode of incident light is relaxed and a coupling loss is reduced. As the widths of the tapered portions become sufficiently wider, mode inconsistency is further relaxed and an effect of reducing a coupling loss also increases.

All the six light input side optical waveguides 21-11, 21-12, 21-21, 21-22, 21-31, and 21-32 and one light output side optical waveguide 22 shown in FIG. 1 are constituted to linearly extend in the x direction, but they are not limited to such a constitution. They may have a curved part.

Optical Coupler (Second Embodiment)

Figure 2:
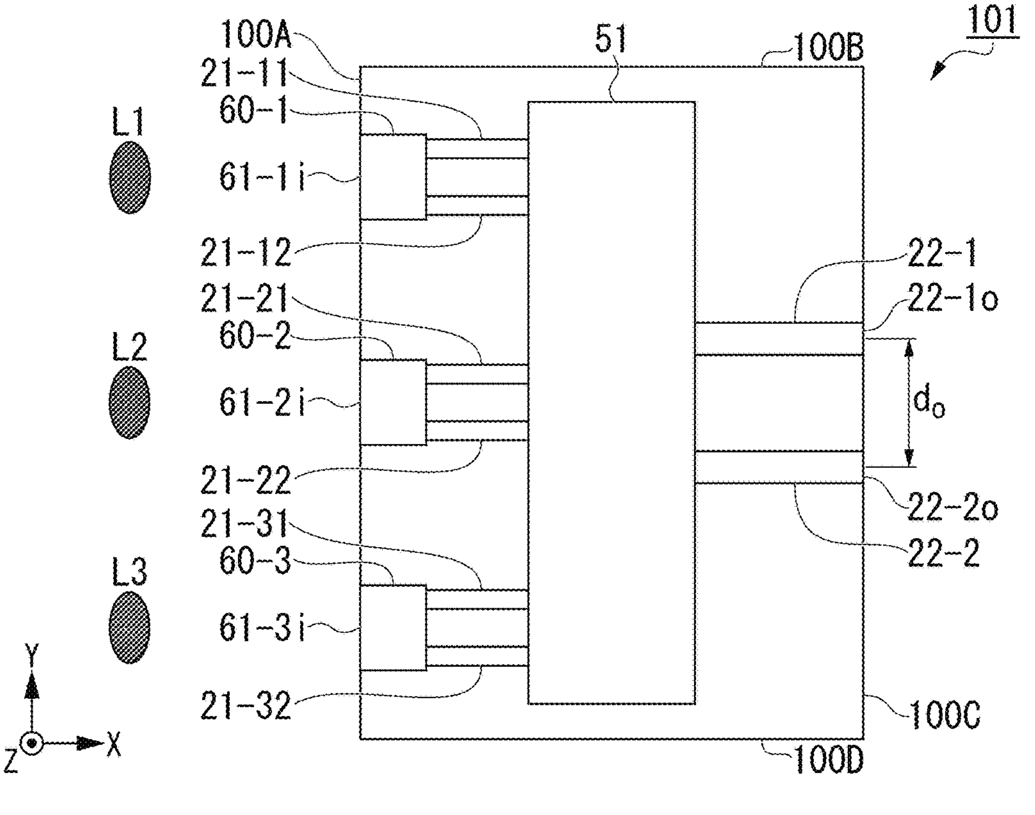
FIG. 2 is a schematic plan view showing an optical coupler according to a second embodiment.

FIG. 2 is a schematic plan view showing an optical coupler according to a second embodiment. Description of members similar to those in the first embodiment may be omitted.

An optical coupler 101 shown in FIG. 2 is an optical coupler for coupling the three laser light beams L1, L2, and L3 having different wavelengths and includes one-input multiple-output multimode interference input parts 60-1, 60-2, and 60-3 provided for each laser beam of the plurality of laser light beams. The optical coupler 101 further includes two light output ports 22-10 and 22-2*o* allowing three laser light beams to be coupled and emitted therethrough, the six light input side optical waveguides 21-11, 21-12, 21-21, 21-22, 21-31, and 21-32 in total extending by two from each of the multimode interference input parts 60-1, 60-2, and 60-3, two light output side optical waveguides 22-1 and 22-2 respectively extending from the two light output ports 22-10 and 22-2*o*, and an optical coupling part 51 having the six light input side optical waveguides 21-11, 21-12, 21-21, 21-22, 21-31, and 21-32 and the two light output side optical waveguides 22-1 and 22-2 connected thereto.

The optical coupler 101 is constituted to not only guide light to the optical coupling part 51 using two optical waveguides for each of laser light beams but also include two light output ports so as to output coupled light from the two light output ports using two optical waveguides from the optical coupling part 51. That is, the laser light L1 is received by the light input port 61-1*i* of the multimode interference (MMI) input part 60-1 and is guided to the optical coupling part 50 using the two light input side optical waveguides 21-11 and 21-12. In addition, the laser light L2 is received by the light input port 61-2*i* of the multimode interference (MMI) input part 60-2 and is guided to the optical coupling part 50 using the two light input side optical waveguides 21-21 and 21-22. The laser light L3 is received by the light input port 61-3*i* of the multimode interference (MMI) input part 60-3 and is guided to the optical coupling part 51 using the two light input side optical waveguides 21-31 and 21-32. Light coupled by the optical coupling part 51 is guided by the light output side optical waveguide 22-1 and is output through the light output port 22-10, and it is also guided by the light output side optical waveguide 22-2 and is output through the light output port 22-2*o*.

In this manner, by providing a plurality of light input side optical waveguides for guiding light to the optical coupling part 51 and by further providing a plurality of light output side optical waveguides for guiding light from the optical coupling part 51, the power density of laser light guided through the optical waveguides can be dispersed so that damage to the optical waveguides can be curbed.

It is preferable that the interval do between the two light output ports 22-1*o* and 22-2*o* be 25 μm or smaller. This is because rays of light appear as one beam, resulting in a clear video image when the optical coupler 101 is applied to retinal projection XR glasses or the like. Here, as shown in FIG. 2, the interval do is a distance between the center of the light output port 22-1*o* and the center of the light output port 22-2*o*.

Optical Coupler (Third Embodiment)

Figure 3:
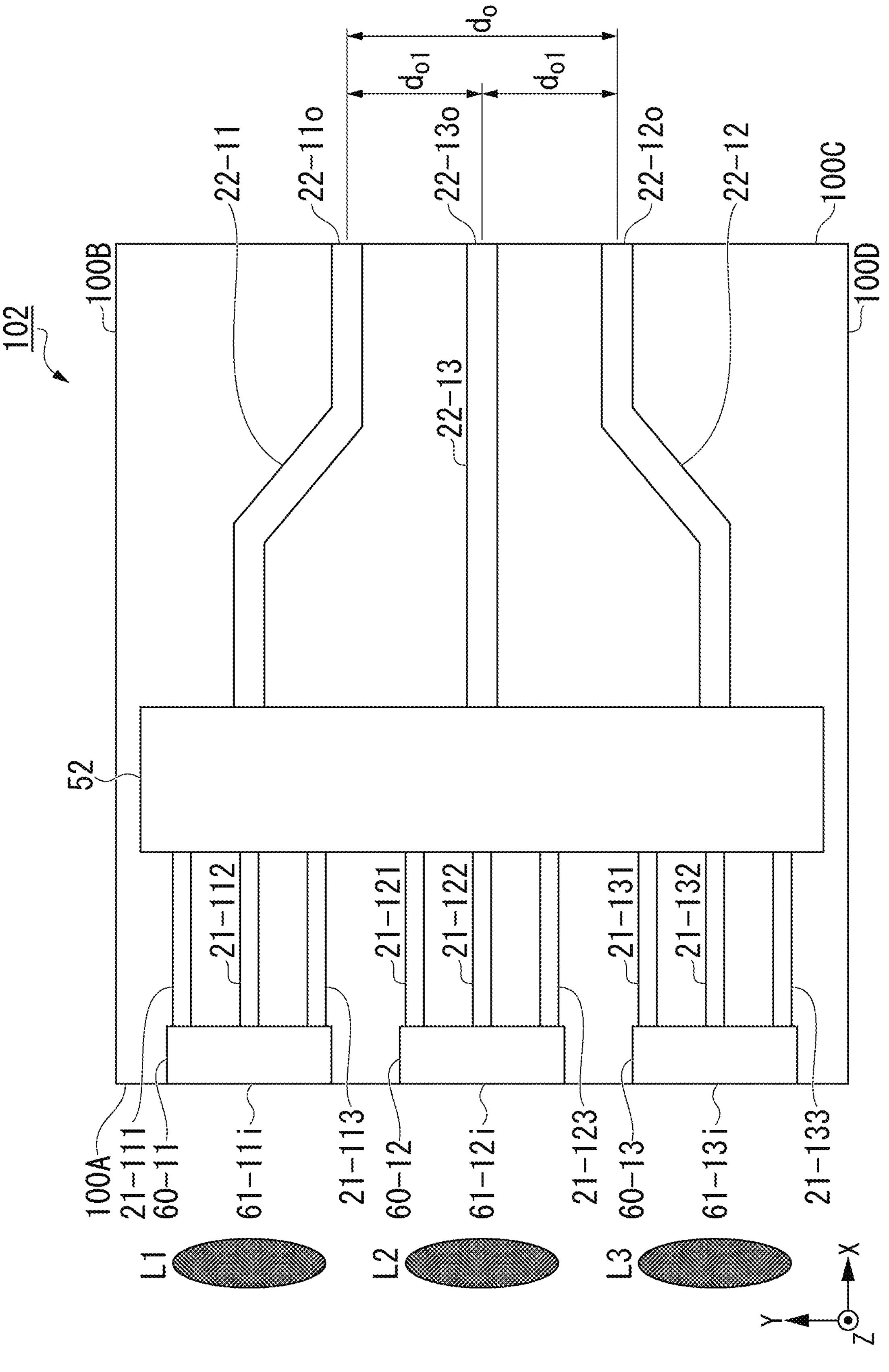
FIG. 3 is a schematic plan view showing an optical coupler according to a third embodiment.

FIG. 3 is a schematic plan view showing an optical coupler according to a third embodiment. Description of members similar to those in the foregoing embodiments may be omitted.

An optical coupler 102 shown in FIG. 3 is an optical coupler for coupling the three laser light beams L1, L2, and L3 having different wavelengths and includes one-input multiple-output multimode interference input parts 60-11, 60-12, and 60-13 provided for each laser beam of the plurality of laser light beams. The optical coupler 102 further includes three light output ports 22-11*o*, 22-12*o*, and 22-13*o* allowing three laser light beams to be coupled and emitted therethrough, nine light input side optical waveguides 21-111, 21-112, 21-113, 21-121, 21-122, 21-123, 21-131, 21-132, and 21-133 in total extending by three from each of the multimode interference input parts 60-11, 60-12, and 60-13, three light output side optical waveguides 22-11, 22-12, and 22-13 respectively extending from the three light output ports 22-11*o*, 22-12*o*, and 22-13*o*, and an optical coupling part 52 having the nine light input side optical waveguides 21-111, 21-112, 21-113, 21-121, 21-122, 21-123, 21-131, 21-132, and 21-133 and three light output side optical waveguides 22-11, 22-12, and 22-13 connected thereto.

The optical coupler 102 is constituted to guide light to the optical coupling part 52 using three optical waveguides for each of laser light beams. That is, the laser light L1 is received by a light input port 61-11*i* of the multimode interference (MMI) input part 60-11 and is guided to the optical coupling part 52 using the three light input side optical waveguides 21-111, 21-112, and 21-113. In addition, the laser light L2 is received by a light input port 61-12*i* of the multimode interference (MMI) input part 60-12 and is guided to the optical coupling part 52 using the three light input side optical waveguides 21-121, 21-122, and 21-123. The laser light L3 is received by a light input port 61-13*i* of the multimode interference (MMI) input part 60-13 and is guided to the optical coupling part 52 using the three light input side optical waveguides 21-131, 21-132, and 21-133.

In addition, the optical coupler 102 is constituted to include three light output ports so as to output coupled light from the three light output ports using three optical waveguides from the optical coupling part 52. That is, light coupled by the optical coupling part 52 is guided by the light output side optical waveguide 22-11 and is output through the light output port 22-11*o*, it is also guided by the light output side optical waveguide 22-12 and is output through the light output port 22-12*o*, and it is also guided by the light output side optical waveguide 22-13 and is output through the light output port 22-13*o*.

In this manner, by providing a plurality of light input side optical waveguides for guiding light to the optical coupling part 52 and by further providing a plurality of light output side optical waveguides for guiding light from the optical coupling part 52, the power density of laser light guided through the optical waveguides can be dispersed so that damage to the optical waveguides can be curbed.

In the three light output ports 22-11*o*, 22-12*o*, and 22-13*o*, it is preferable that the interval do between the two light output ports 22-11*o* and 22-12*o* at both ends be 25 μm or smaller. It is preferable that an interval $d_{o1}$ between the two adjacent light output ports 22-11*o* and 22-13*o* and the interval $d_{o1}$ between the two light output ports 22-12*o* and 22-13*o* be 10 μm or smaller.

This is because rays of light appear as one beam, resulting in a clear video image when the optical coupler 102 is applied to retinal projection XR glasses or the like.

The optical coupling part 52 is a nine-input three-output type MMI coupler.

Optical Coupler (Fourth Embodiment)

Figure 4:
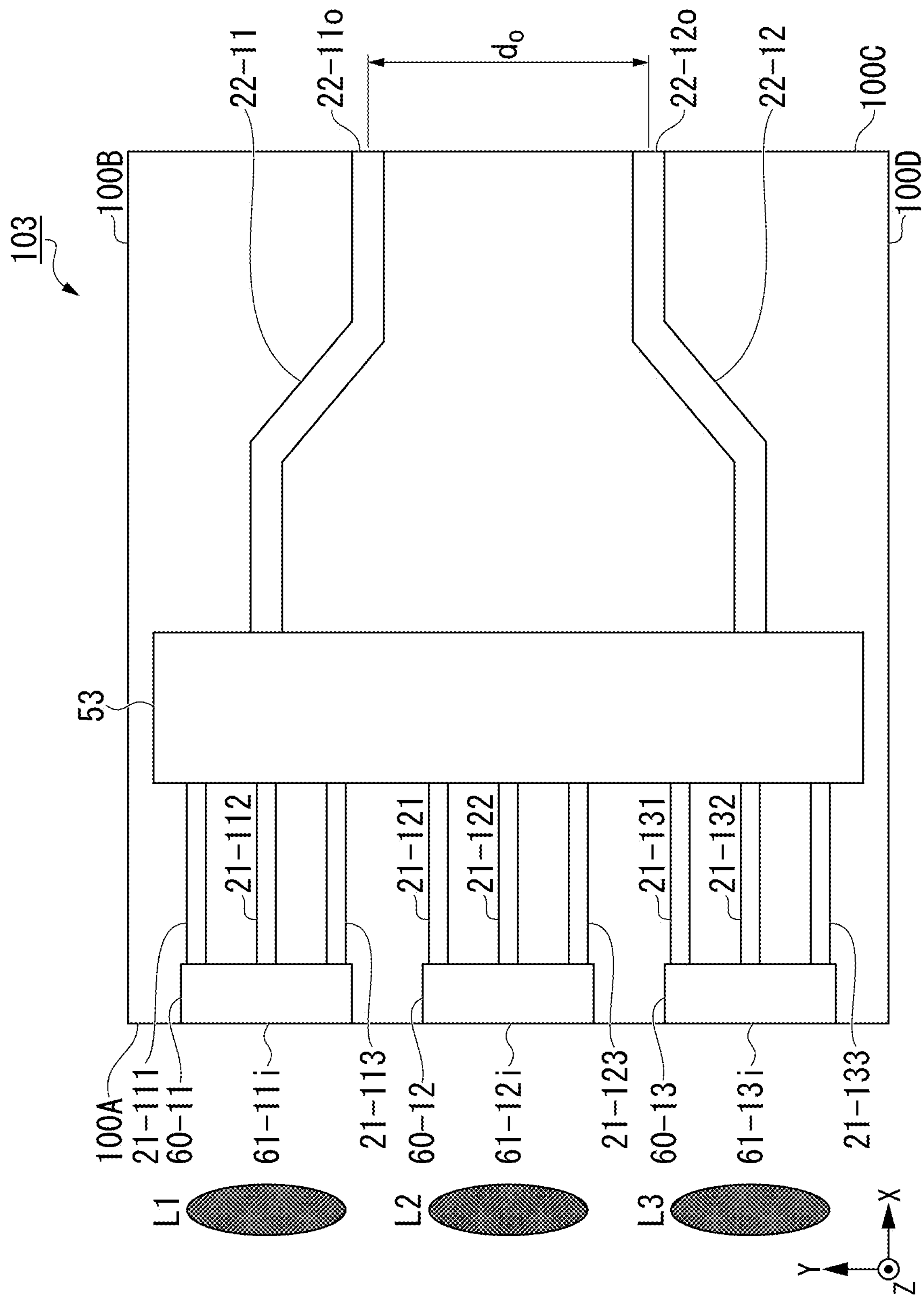
FIG. 4 is a schematic plan view showing an optical coupler according to a fourth embodiment.

FIG. 4 is a schematic plan view showing an optical coupler according to a fourth embodiment. Description of members similar to those in the foregoing embodiments may be omitted.

The optical coupler according to the fourth embodiment is obtained by replacing the optical coupling part 52 (nine-input three-output type MMI coupler) with an optical coupling part 53 (nine-input two-output type MMI coupler) in the optical coupler according to the fourth embodiment shown in FIG. 3.

An optical coupler 103 shown in FIG. 4 is an optical coupler for coupling the three laser light beams L1, L2, and L3 having different wavelengths and includes one-input multiple-output multimode interference input parts 60-11, 60-12, and 60-13 provided for each laser beam of the plurality of laser light beams. The optical coupler 103 further includes two light output ports 22-11*o* and 22-12*o* allowing three laser light beams to be coupled and emitted therethrough, the nine light input side optical waveguides 21-111, 21-112, 21-113, 21-121, 21-122, 21-123, 21-131, 21-132, and 21-133 in total extending by three from each of the multimode interference input parts 60-11, 60-12, and 60-13, the two light output side optical waveguides 22-11 and 22-12 respectively extending from the two light output ports 22-11*o* and 22-12*o*, and the optical coupling part 53 having the nine light input side optical waveguides 21-111, 21-112, 21-113, 21-121, 21-122, 21-123, 21-131, 21-132, and 21-133 and the two light output side optical waveguides 22-11 and 22-12 connected thereto.

The optical coupler 103 is constituted to guide light to the optical coupling part 53 using three optical waveguides for each of laser light beams. That is, the laser light L1 is received by the light input port 61-11*i* of the multimode interference (MMI) input part 60-11 and is guided to the optical coupling part 53 using the three light input side optical waveguides 21-111, 21-112, and 21-113. In addition, the laser light L2 is received by the light input port 61-12*i* of the multimode interference (MMI) input part 60-12 and is guided to the optical coupling part 53 using the three light input side optical waveguides 21-121, 21-122, and 21-123. The laser light L3 is received by the light input port 61-13*i* of the multimode interference (MMI) input part 60-13 and is guided to the optical coupling part 53 using the three light input side optical waveguides 21-131, 21-132, and 21-133.

In addition, the optical coupler 103 is constituted to include two light output ports so as to output coupled light from the three light output ports using two optical waveguides from the optical coupling part 53. That is, light coupled by the optical coupling part 53 is guided by the light output side optical waveguide 22-11 and is output through the light output port 22-11*o*, and it is also guided by the light output side optical waveguide 22-12 and is output through the light output port 22-12*o*.

In this manner, by providing a plurality of light input side optical waveguides for guiding light to the optical coupling part 53 and by further providing a plurality of light output side optical waveguides for guiding light from the optical coupling part 53, the power density of laser light guided through the optical waveguides can be dispersed so that damage to the optical waveguides can be curbed.

It is preferable that the interval do between the two light output ports 22-11*o* and 22-12*o* be 25 μm or smaller.

This is because rays of light appear as one beam, resulting in a clear video image when the optical coupler 103 is applied to retinal projection XR glasses or the like.

[Optical Coupling Member]

An optical coupling member according to the embodiment of the present disclosure includes a substrate that is made of a material different from lithium niobate, and an optical coupling function layer that is formed on a main surface of the substrate and is constituted of a lithium niobate film. The optical coupler according to the foregoing embodiments is formed in the optical coupling function layer. Regarding the constituent elements which will be described below, the same reference signs are applied to constituent elements having functions similar to those in the foregoing embodiments and description thereof may be omitted. An optical coupling member 200 shown in FIG. 5 will be described with an example in which the optical coupler 100 shown in FIG. 1 is formed in the optical coupling function layer.

Figure 5:
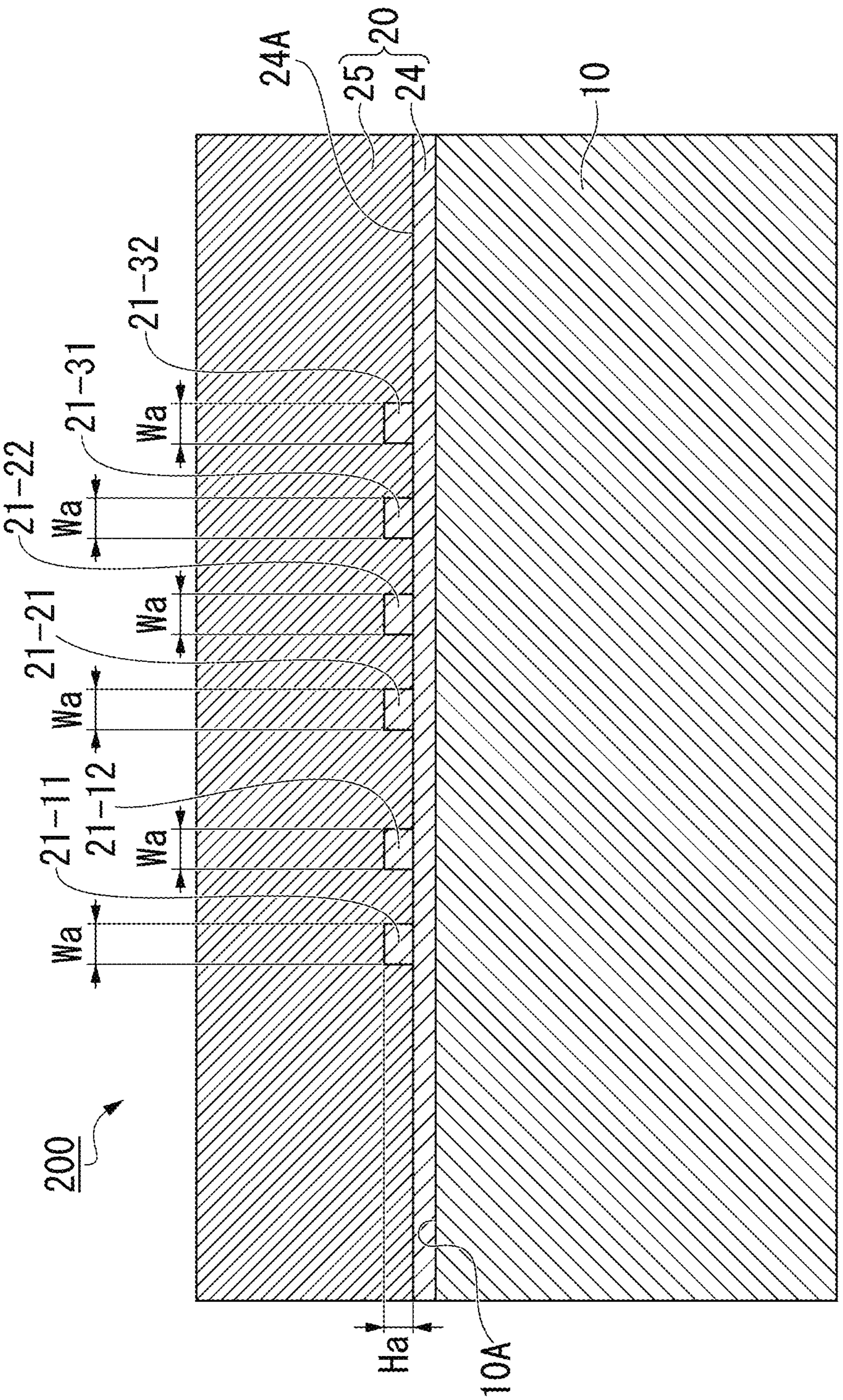
FIG. 5 is a schematic cross-sectional view, which is cut along X-X' in FIG. 1, of an optical coupling member in which the constituent element shown in FIG. 1 is formed in an optical coupling function layer made of lithium niobate.

FIG. 5 is a schematic cross-sectional view, which is cut along a YZ plane (X-X' in FIG. 1), of the optical coupling member 200 in which the optical coupler 100 shown in FIG. 1 is formed in the optical coupling function layer made of lithium niobate.

The optical coupling member 200 shown in FIG. 5 includes a substrate 10 that is made of a material different from lithium niobate, and an optical coupling function layer 20 that is formed on a main surface of the substrate 10 and is made of lithium niobate. The multimode interference input parts, the light output ports, the optical coupling part, the light input side optical waveguides, and the light output side optical waveguides are formed in the optical coupling function layer 20.

In the optical coupling member 200, when a refractive index difference between a waveguide core film and a waveguide cladding film is Δn, if the waveguide core film is made of lithium niobate, it can be designed to have a larger Δn than in the case of using a material such as a glass, and curvature radii of the optical waveguides can be reduced. Moreover, increase in coupling length is prevented using a multimode-interference-type optical coupling part compared to the case of using a directional coupler, and therefore both improvement in degree of freedom in design and miniaturization can be achieved.

The optical coupling function layer 20 is constituted of a waveguide core film 24 which is constituted of a lithium niobate film having the light input ports, the light output ports, the optical coupling part, the light input side optical waveguides, and the light output side optical waveguides formed thereon; and a waveguide cladding (buffer) film 25 which is formed on the waveguide core film 24 such that these are covered. Hereinafter, the reference sign 24 may also be used for the lithium niobate film.

Examples of the substrate 10 can include a sapphire substrate, a Si substrate, and a thermal oxidation silicon substrate.

Since the optical coupling function layer 20 is constituted of a lithium niobate ($LiNbO_3$) film, it is not particularly limited as long as it has a lower refractive index than the lithium niobate film. However, a sapphire single crystal substrate or a silicon single crystal substrate is preferably used as a substrate on which a single crystal lithium niobate film can be formed as an epitaxial film. The crystal orientation of the single crystal substrate is not particularly limited. However, for example, since the lithium niobate film with a c-axis orientation has three-fold symmetry, it is desirable that the single crystal substrate (base) also have the same symmetry, and it is preferable to use a substrate having a c plane in the case of a sapphire single crystal substrate and use a substrate having a (111) plane in the case of a silicon single crystal substrate.

For example, the lithium niobate film is a c-axis oriented lithium niobate film. For example, the lithium niobate film is an epitaxial film which is epitaxially grown on the substrate 10. The epitaxial film denotes a single crystal film in which the crystal orientation is aligned by the base substrate. The epitaxial film is a film having a single crystal orientation in a z direction and an in-plane direction within an xy plane, in which crystals are oriented in a manner of being aligned in all of an x axis direction, a y axis direction, and a z axis direction. Whether or not a film formed on the substrate 10 is an epitaxial film can be verified by checking the peak intensity and the pole at the orientation position in 2θ-θ X-ray diffraction, for example.

Specifically, when measurement is performed with 2θ-θ X-ray diffraction, all peak intensities except for that in a target plane are equal to or lower than 10% and are preferably equal to or lower than 5% of the maximum peak intensity in the target plane. For example, when the lithium niobate film is a c-axis oriented epitaxial film, the peak intensities except for that in a (00L) plane are equal to or lower than 10% and are preferably equal to or lower than 5% of the maximum peak intensity in the (00L) plane. Here, (00L) is a general term for equivalent planes such as (001) and (002).

In addition, conditions for confirming the peak intensity at the orientation position described above simply indicate the orientation in one direction. Thus, even if the conditions described above are met, when the crystal orientation is not aligned within a plane, the intensity of X-rays does not increase at a particular angular position, and no poles are observed. For example, in the case of the lithium niobate film, since $LiNbO_3$ has a trigonal crystal structure, there are three poles of $LiNbO_3$ (014) in a single crystal. In the case of lithium niobate, it is known that epitaxial growth occurs in a so-called twin crystal state in which crystals rotated by 180° about the c-axis are symmetrically coupled. In this case, since two poles are in a symmetrically coupled state in each of three poles, there are six poles. In addition, when a lithium niobate film is formed on a silicon single crystal substrate having a (100) plane, since the substrate has four-fold symmetry, twelve poles (4×3=12) are observed. In the present disclosure, a lithium niobate film which has been epitaxially grown in a twin crystal state is also included in an epitaxial film.

The composition of lithium niobate is $Li_xNbA_yO_z$. A is an element other than Li, Nb, and O. The subscript x is 0.5 to 1.2 and is preferably 0.9 to 1.05. The subscript y is 0 to 0.5. The subscript z is 1.5 to 4.0 and is preferably 2.5 to 3.5. For example, the element A is K, Na, Rb, Cs, Be, Mg, Ca, Sr, Ba, Ti, Zr, Hf, V, Cr, Mo, W, Fe, Co, Ni, Zn, Sc, or Ce, and two or more kinds of these elements may be combined.

Moreover, a lithium niobate single crystal thin film pasted on a substrate may be adopted as the lithium niobate film.

The film thickness of the lithium niobate film is 2 μm or smaller, for example. The film thickness of the lithium niobate film indicates the film thickness of a part other than ridges. Optimal design of the film thickness of the lithium niobate film may be suitably performed in accordance with the wavelength, the ridge shape, and the like used.

A waveguide is a ridge protruding from a first surface 24A of the lithium niobate film 24. The first surface 24A is an upper surface of the lithium niobate film 24 in a part (slab layer) except for the ridges.

As shown in FIG. 5, cross-sectional shape forming portions of the light input side optical waveguides 21-11, 21-12, 21-21, 21-22, 21-31, and 21-32 each have a rectangular cross-sectional shape. However, they need only have a shape capable of guiding light. For example, they may have a trapezoidal shape, a triangular shape, a semicircular shape, or the like. Widths Wa of three ridges in a y direction are preferably 0.2 μm to 5.0 μm, and heights of the three ridges (protrusion heights Ha from the first surface 24A) are preferably 0.1 μm to 1.0 μm, for example. The same applies to other optical waveguides.

Propagation in a single mode can be achieved by setting the light input side optical waveguides 21-11, 21-12, 21-21, 21-22, 21-31, and 21-32, and other optical waveguides shown in FIG. 1 to approximately the wavelength of laser light.

Figure 6:
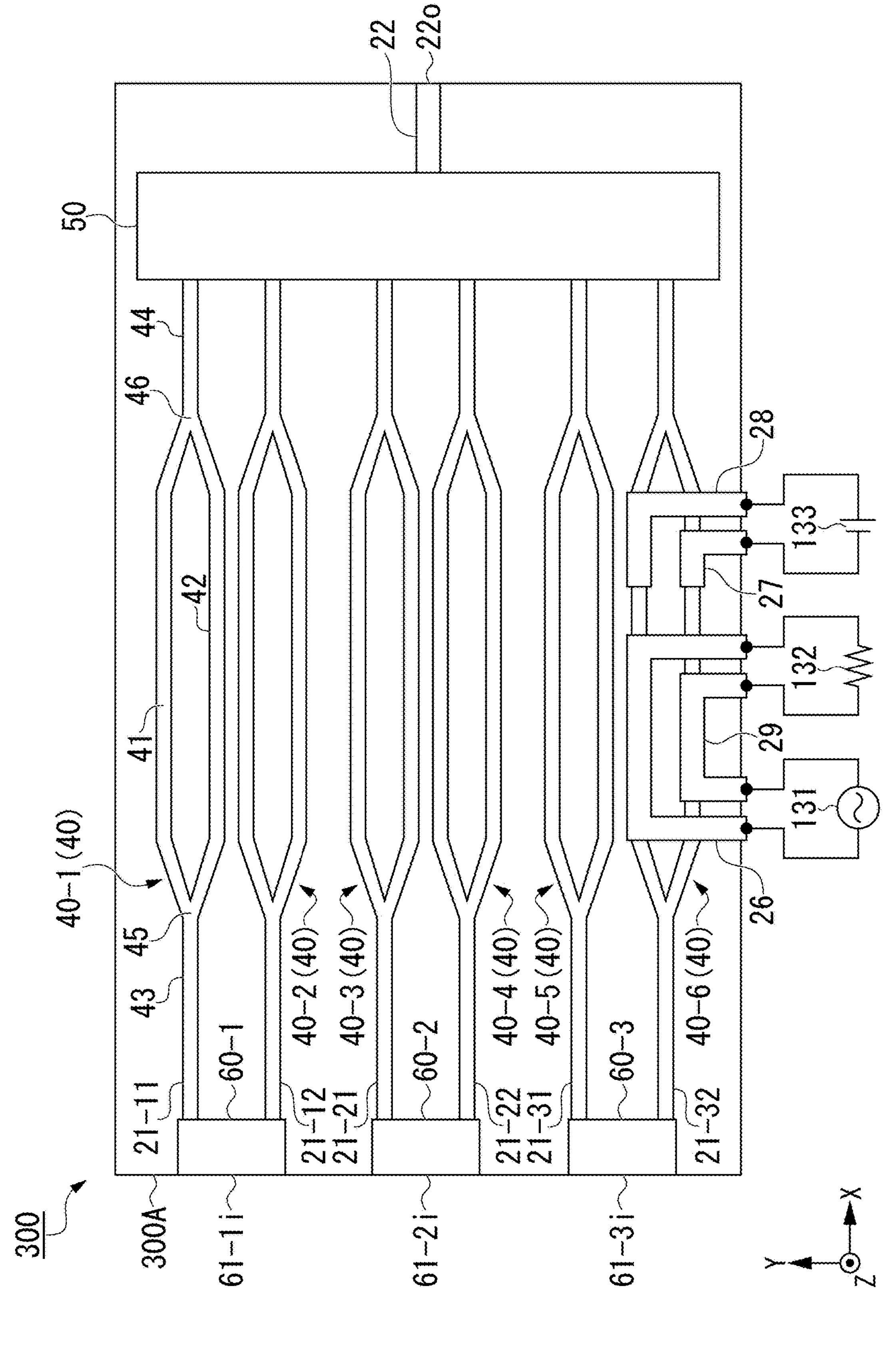
FIG. 6 is a schematic plan view of a modification example of an optical coupling member according to the embodiment of the present disclosure.

FIG. 6 is a schematic plan view of a modification example of an optical coupling member according to the embodiment of the present disclosure.

An optical coupling member 300 shown in FIG. 6 is an optical coupling member with an optical modulation function including the substrate 10 that is made of a material different from lithium niobate (refer to FIG. 5), and the optical coupling function layer 20 that is formed on the main surface of the substrate 10 and is constituted of a lithium niobate film, and it has the optical coupler according to the foregoing embodiments and a Mach-Zehnder optical modulator formed inside the optical coupling function layer 20.

The optical coupling member 300 with an optical modulation function shown in FIG. 6 is an example of a case in which the optical coupler 100 shown in FIG. 1 of the optical couplers according to the foregoing embodiments is provided.

The optical coupling member 300 with an optical modulation function includes the optical coupler 100 and a Mach-Zehnder optical modulator 40 inside the optical coupling function layer 20.

The Mach-Zehnder optical modulator 40 includes six Mach-Zehnder optical waveguides 40-1, 40-2, 40-3, 40-4, 40-5, and 40-6.

The Mach-Zehnder optical waveguide 40-1 is provided between the light input side optical waveguide 21-11 and the optical coupling part 50. The Mach-Zehnder optical waveguide 40-2 is provided between the light input side optical waveguide 21-12 and the optical coupling part 50. The Mach-Zehnder optical waveguide 40-3 is provided between the light input side optical waveguide 21-21 and the optical coupling part 50. The Mach-Zehnder optical waveguide 40-2 is provided between the light input side optical waveguide 21-22 and the optical coupling part 50. The Mach-Zehnder optical waveguide 40-5 is provided between the light input side optical waveguide 21-31 and the optical coupling part 50. The Mach-Zehnder optical waveguide 40-6 is provided between the light input side optical waveguide 21-32 and the optical coupling part 50.

A known Mach-Zehnder optical modulator or known optical waveguides can be used as the Mach-Zehnder optical modulator 40, and light beams having the same wavelengths and the same phases are each divided (caused to branch) into two beams forming a pair and are joined (coupled) together after different phases are respectively applied thereto. The intensity of the coupled light beam varies depending on the phase difference.

Each of the Mach-Zehnder optical waveguides 40 (40-1, 40-2, 40-3, 40-4, 40-5, and 40-6) shown in FIG. 6 has an optical waveguide 41, an optical waveguide 42, an input path 43, an output path 44, a branching portion 45, and a coupling portion 46. In the diagram, the reference signs of the respective constitutions are indicated for only the Mach-Zehnder optical waveguide 40-1.

The output paths 44 of the Mach-Zehnder optical waveguides 40-1, 40-2, 40-3, 40-4, 40-5, and 40-6 are optically connected to the optical coupling part 50.

The first optical waveguide 41 and the second optical waveguide 42 shown in FIG. 6 are constituted to linearly extend in the x direction except for a part in the vicinity of the branching portion 45 and a part in the vicinity of the coupling portion 46, but they are not limited to such a constitution. The lengths of the first optical waveguide 41 and the second optical waveguide 42 shown in FIG. 6 are substantially the same. The branching portion 45 is provided between the input path 43, and the first optical waveguide 41 and the second optical waveguide 42. The input path 43 leads to the first optical waveguide 41 and the second optical waveguide 42 via the branching portion 45. The coupling portion 46 is provided between the first optical waveguide 41 and the second optical waveguide 42, and the output path 44. The first optical waveguide 41 and the second optical waveguide 42 lead to the output path 44 via the coupling portion 46.

Electrodes 29 and 26 are electrodes for applying a modulation voltage to each of the Mach-Zehnder optical waveguides 40-1, 40-2, 40-3, 40-4, 40-5, and 40-6 (which may hereinafter be simply referred to as "each of the Mach-Zehnder optical waveguides 40"). The electrode 29 is an example of a first electrode, and the electrode 26 is an example of a second electrode. One end of the electrode 29 is connected to a power source 131, and the other end is connected to a terminating resistor 132. One end of the electrode 26 is connected to the power source 131, and the other end is connected to the terminating resistor 132. The power source 131 is a part of a drive circuit for applying a modulation voltage to each of the Mach-Zehnder optical waveguides 40. For the sake of simplification of the drawings, the electrodes 29 and 26 are depicted only in the part of the Mach-Zehnder optical waveguide 40-6.

Electrodes 27 and 28 are electrodes for applying a DC bias voltage to each of the Mach-Zehnder optical waveguides 40. One end of the electrode 27 and one end of the electrode 28 are connected to a power source 133. The power source 133 is a part of a DC bias applying circuit for applying a DC bias voltage to each of the Mach-Zehnder optical waveguides 40.

When a DC bias voltage is superimposed on the electrodes 29 and 26, the electrodes 27 and 28 may not be provided. In addition, a ground electrode may be provided around the electrodes 29, 26, 27, and 28.

Visible Light Source Module (First Embodiment)

A visible light source module according to the first embodiment includes the optical coupling member according to the foregoing embodiments, and a plurality of visible laser light sources that emit visible light coupled by the optical coupling member.

Figure 7:
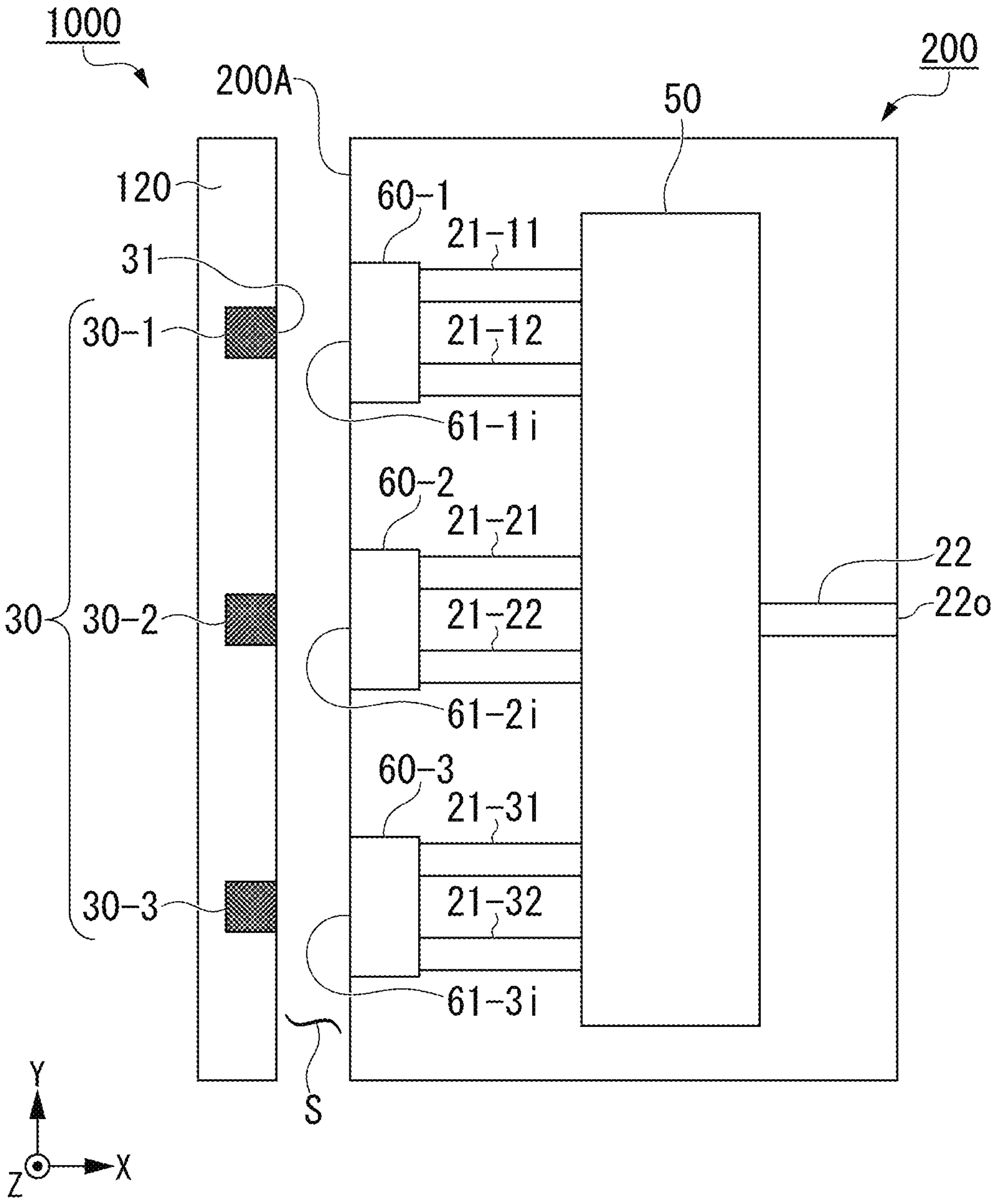
FIG. 7 is a schematic plan view of a visible light source module according to the first embodiment.

FIG. 7 is a schematic plan view of a visible light source module according to the present embodiment. FIG. 7 shows an example of a visible light source module including the optical coupling member 200 shown in FIG. 5.

A visible light source module 1000 shown in FIG. 7 includes the optical coupling member 200 that includes the optical coupling part 50, and three visible laser light sources 30 (30-1, 30-2, and 30-3) that emit visible light coupled by the optical coupling member 200. The optical coupling member 200 includes the substrate 10 that is made of a material different from lithium niobate (refer to FIG. 5), and the optical coupling function layer 20 (refer to FIG. 5) that is formed on the main surface of the substrate 10 and is made of lithium niobate, and it has a side surface 200A serving as a light incidence surface.

Regarding the constituent elements shown in FIG. 7, the same reference signs are applied to constituent elements having functions similar to those above and description thereof may be omitted.

Various kinds of laser elements can be used as the visible laser light sources 30. For example, commercially available laser diodes (LDs) of red light, green light, blue light, and the like can be used. Light having a peak wavelength of 600 nm to 750 nm can be used as red light, light having a peak wavelength of 500 nm to 600 nm can be used as green light, and light having a peak wavelength of 380 nm to 500 nm can be used as blue light.

In the visible light source module 1000, for example, the visible laser light sources 30-1, 30-2, and 30-3 respectively serve as an LD emitting red light, an LD emitting green light, and an LD emitting blue light. The LDs 30-1, 30-2, and 30-3 are disposed with an interval therebetween in a direction substantially orthogonal to an emission direction of light emitted from each of the LDs and are provided on an upper surface of a subcarrier 120.

In the visible light source module 1000, a case in which the number of visible laser light sources is three has been described as an example. However, as long as there are a plurality of visible laser light sources, the number thereof is not limited to three and may be two or four or more. The plurality of visible laser light sources may all have different wavelengths of emitted light, and there may be visible laser light sources having the same wavelengths of emitted light. In addition, light other than red (R), green (G), and blue (B) can also be used as emitted light. A mounting order of red (R), green (G), and blue (B) described using the drawings does not need to be in this order and can be suitably changed.

The LDs 30 can be mounted on the subcarrier 120 as bare chips. For example, the subcarrier 120 is constituted using aluminum nitride (AlN), aluminum oxide ($Al_2O_3$), silicon (Si), or the like.

The subcarrier 120 can be constituted to be directly bonded to the substrate 10 with a metal bonding layer therebetween. Due to this constitution, spatial coupling or fiber coupling is not performed, and therefore further miniaturization can be achieved.

Due to the constitution in which the subcarrier 120 and the substrate 10 are bonded with a metal bonding layer therebetween, the optical axes of laser light beams can be positionally aligned (active alignment) by adjusting relative positions of the subcarrier 120 and the substrate 10 at the time of manufacturing such that the optical axis of each visible light laser matches the axis of each of the multimode interference input part 60-1, the multimode interference input part 60-2, and the multimode interference input part 60-3.

In the visible light source module 1000, the light input port (light input port) 61-1*i* of the multimode interference input part 60-1, the light input port (light input port) 61-2*i* of the multimode interference input part 60-2, and the light input port (light input port) 61-3*i* of the multimode interference (MMI) input part 60-3 respectively face emission ports of the LDs 30 (30-1, 30-2, and 30-3) and are positionally set such that rays of light emitted from emission surfaces of the LDs 30 can be respectively incident on the light input ports 61-1*i*, 61-2*i*, and 61-3*i*. Due to such a constitution and disposition, red light, green light, and blue light emitted from the LDs 30-1, 30-2, and 30-3 can be incident on the three multimode interference input parts 60-1, 60-2, and 60-3 of the optical coupling part 50.

In the visible light source module 1000, light emission surfaces 31 of the LDs 30 and a light incidence surface 200A of the optical coupling member 200 are disposed with a predetermined interval therebetween. The light incidence surface 200A faces the light emission surfaces 31, and there is a gap S between the light emission surfaces 31 and the light incidence surface 200A in the x direction. Since the visible light source module 1000 is exposed in the air, the gap S is filled with air. Since the gap S is in a state of being filled with the same gas (air), it is easy to cause rays of light of colors respectively emitted from the LDs 30 to be incident on incidence paths in a state of satisfying predetermined coupling efficiency. When the visible light source module 1000 is used in AR glasses and VR glasses, in consideration of the amount of light and the like required for AR glasses and VR glasses, the size of the gap (interval) S in the x direction is larger than 0 μm and is equal to or smaller than 5 μm, for example.

Visible Light Source Module (Second Embodiment)

Figure 8:
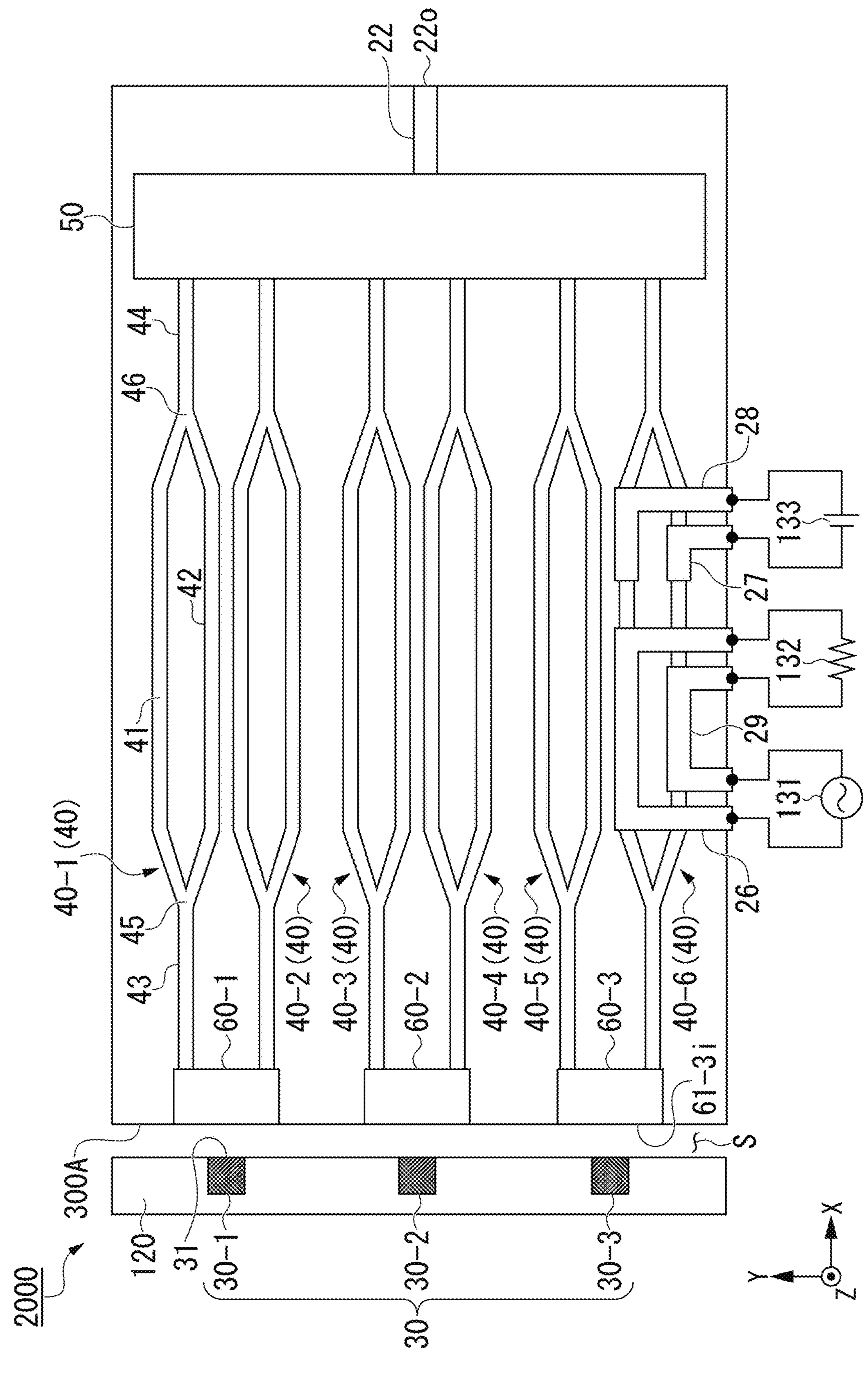
FIG. 8 is a schematic plan view of a visible light source module according to the second embodiment.

FIG. 8 is a schematic plan view of a visible light source module according to the second embodiment.

A visible light source module 2000 shown in FIG. 8 includes the optical coupling member 300 with an optical modulation function shown in FIG. 6, and the plurality of visible laser light sources 30 (30-1, 30-2, and 30-3) that emit visible light coupled by the optical coupling member 300 with an optical modulation function. The optical coupling member 300 includes the substrate 10 that is made of a material different from lithium niobate (refer to FIG. 5), and the optical coupling function layer 20 (refer to FIG. 5) that is formed on the main surface of the substrate 10 and is made of lithium niobate, and it has a side surface 300A.

Regarding the constituent elements shown in FIG. 8, the same reference signs are applied to constituent elements exhibiting functions similar to those above and description thereof may be omitted.

The visible light source module 2000 has the six Mach-Zehnder optical waveguides 40-1, 40-2, 40-3, 40-4, 40-5, and 40-6 corresponding to twice the number of visible laser light sources 30-1, 30-2, and 30-3. The visible laser light sources 30-1, 30-2, and 30-3 and the light input port 61-1*i* of the multimode interference input part 60-1, the light input port 61-2*i* of the multimode interference input part 60-2, and the light input port 61-3*i* of the multimode interference (MMI) input part 60-3 (refer to FIG. 6) are positionally set such that rays of light emitted from the visible laser light sources are incident on the corresponding Mach-Zehnder optical waveguides.

The subcarrier 120 in which the visible laser light sources 30-1, 30-2, and 30-3 are mounted and the substrate 10 on which the optical coupling function layer 20 having the optical coupling member 300 with an optical modulation function is formed can be constituted to be directly bonded with a metal bonding layer therebetween. Due to this constitution, spatial coupling or fiber coupling is not performed, and therefore further miniaturization can be achieved.

In addition, the optical axes of laser light beams can be positionally aligned (active alignment) by adjusting the relative positions of the subcarrier 120 and the substrate 10 at the time of manufacturing.

For example, the size of the optical coupling function layer 20 is 100 $mm^2$ or smaller. If the size of the optical coupling function layer 20 is 100 $mm^2$ or smaller, it is suitable for XR glasses such as AR glasses and VR glasses.

The optical coupling function layer 20 can be produced by a known method. For example, the optical coupling function layer 20 is manufactured using a semiconductor process such as epitaxial growth, photolithography, etching, vapor-phase growth, or metallization.

When the visible light source module according to the present disclosure is applied for XR glasses such as AR glasses and VR glasses, it is preferable that the widths of a multimode-interference-type optical coupling part constituting the optical coupler be approximately 1 to 1,000 μm, for example, and it is preferable that the lengths thereof be approximately 10 to 10,000 μm, for example.

For example, in a retinal projection display, in order to display an image with desired colors, there is a need for the respective intensities of three RGB colors expressing visible light to be independently modulated at a high speed. If such modulation is performed with respect to only the visible laser light sources (current modulation), the load on an IC controlling the modulation thereof will increase. However, modulation (voltage modulation) by the Mach-Zehnder optical modulator 40 (the optical coupling member 300 with an optical modulation function) can also be used together. In this case, coarse adjustment may be performed using a current (visible light laser light source) and fine adjustment may be performed using a voltage (the Mach-Zehnder optical modulator 40). Alternatively, coarse adjustment may be performed using a voltage (the Mach-Zehnder optical modulator 40) and fine adjustment may be performed using a current (visible light laser light source). Since fine adjustment performed using a voltage has better responsiveness, when responsiveness is regarded as important, it is preferable to employ the former method. Since fine adjustment performed using a current requires a lower current which restrains power consumption, when restraint of power consumption is regarded as important, it is preferable to employ the latter method.

[Optical Engine]

In this specification, an optical engine is a device including a plurality of light sources, an optical system which includes a coupling part causing a plurality of rays of light emitted from the plurality of light sources to become one ray of light, an optical scanning mirror which reflects light emitted from the optical system by changing an angle such that an image is displayed, and a control element which controls the optical scanning mirror.

Figure 9:
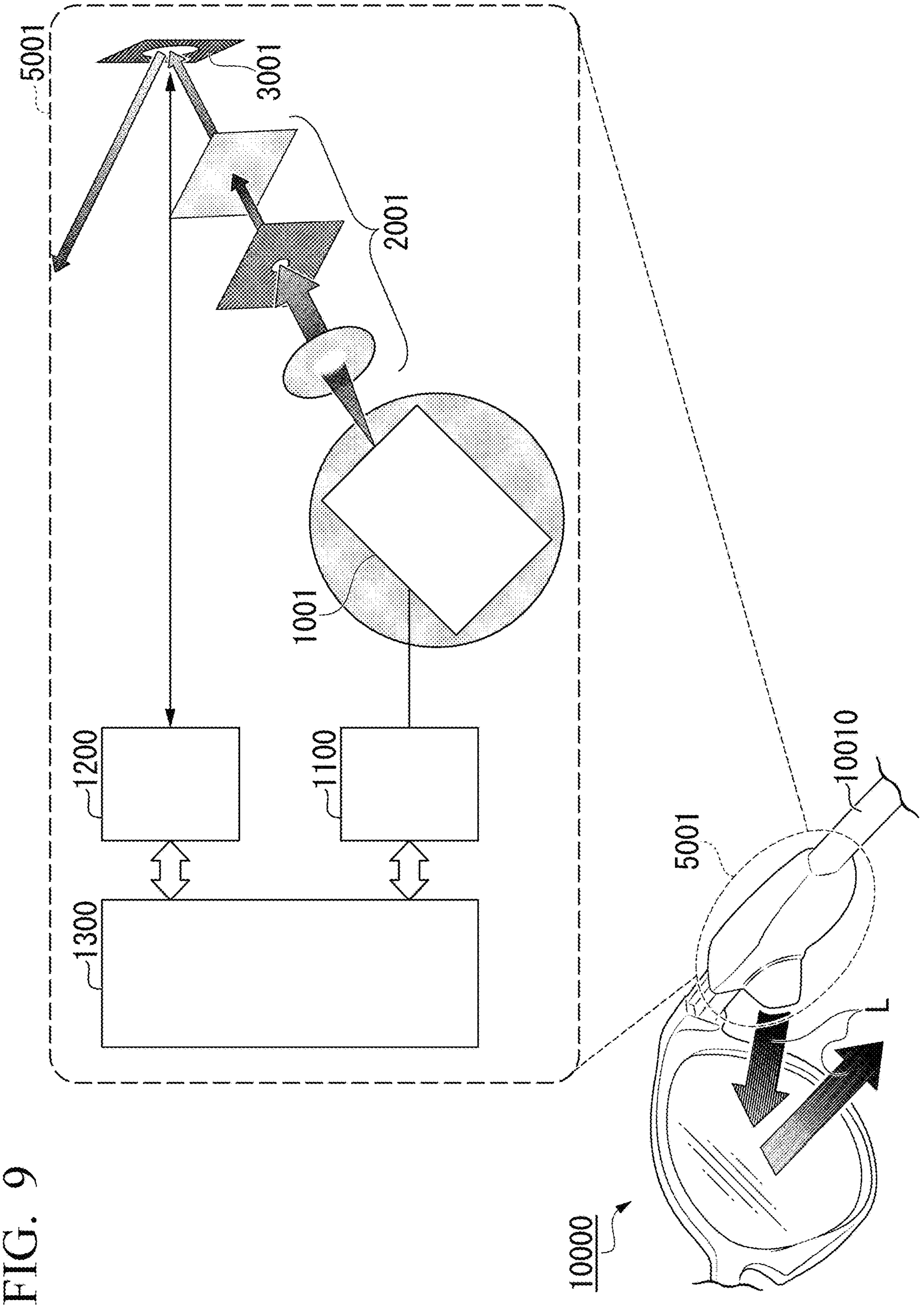
FIG. 9 is an explanatory conceptual diagram of an optical engine according to the present embodiment.

FIG. 9 shows an explanatory conceptual diagram of an optical engine 5001 according to the present embodiment. The diagram shows a state in which a frame 10010 of glasses 10000 is equipped with the optical engine 5001. The reference sign L indicates image display light.

The optical engine 5001 has a visible light source module 1001 and an optical scanning mirror 3001. The visible light source module according to the embodiments described above is used as the visible light source module 1001 to be provided in the optical engine 5001.

Irradiation laser light from the visible light source module 1001 attached to the glasses frame is reflected and scanned by the optical scanning mirror and enters the human eye so that an image (video image) is directly projected onto the retina.

For example, the optical scanning mirror 3001 is an MEMS mirror. In order to project a 2D image, it is preferable to adopt a two-axis MEMS mirror which vibrates so as to reflect laser light by changing the angle in the horizontal direction (X direction) and the vertical direction (Y direction).

The optical engine 5001 has a collimator lens 2001*a*, a slit 2001*b*, and an ND filter 2001*c* as an optical system for optically processing laser light emitted from the visible light source module 1001. This optical system is an example, and it may have a different constitution.

The optical engine 5001 has a laser driver 1100, an optical scanning mirror driver 1200, and a video controller 1300 which controls these drivers.

EXAMPLES

Hereinafter, the present disclosure will be described in more detail using Examples. However, the present disclosure is not limited to the following Examples in any way.

In Example 1, an optical coupling member having the constitution shown in FIG. 2 was used.

In Examples 2 and 4 to 5, an optical coupling member having the constitution shown in FIG. 4 was used.

Example 3 was an optical coupling member having the constitution shown in FIG. 3.

In Example 6, an optical coupling member having the constitution shown in FIG. 1 was used.

In Comparative Example 1, an optical coupling member having the constitution shown in FIG. 1 in which the optical coupling part 50 was replaced with a three-input one-output type MMI optical coupler was used.

Table 1 shows whether or not the input ports have shapes of MMI input portions. The coupling efficiency with respect to a laser indicates the results investigated through simulations. Fimmwave (PHOTON Design Corporation) was used as simulation software. The coupling efficiency with respect to a laser indicates the proportion of the power of laser light which has been propagated to the side of the light input side optical waveguides. The interval between the output ports corresponds to the distance indicated by the reference sign do in FIGS. 2 to 4. Deterioration of the optical waveguides was judged based on the shapes of laser beams output through the light output ports. When the shapes of laser beams input to the light input side optical waveguides and the shapes of laser beams output through the light output ports had a similarity relationship, it was considered that there was no deterioration, and when they had no similarity relationship and there was change in shape, it was considered that deterioration occurred.

TABLE 1

| | Shape of input port | Coupling efficiency with respect to laser [%] | Number of light input side optical waveguides extending from respective MMI input parts | Number of light output side optical waveguides extending from optical coupling part | Interval between output ports [μm] |
|---|---|---|---|---|---|
| Example 1 | MMI | 60 | 2 | 2 | 25 |
| Example 2 | MMI | 60 | 3 | 2 | 25 |
| Example 3 | MMI | 60 | 3 | 3 | 20 |
| Example 4 | MMI | 60 | 2 | 2 | 20 |
| Example 5 | MMI | 60 | 2 | 2 | 5 |
| Example 6 | MMI | 60 | 2 | 1 | — |
| Comparative Example 1 | Straight waveguide | 60 | — | 1 | — |

Figure 10:
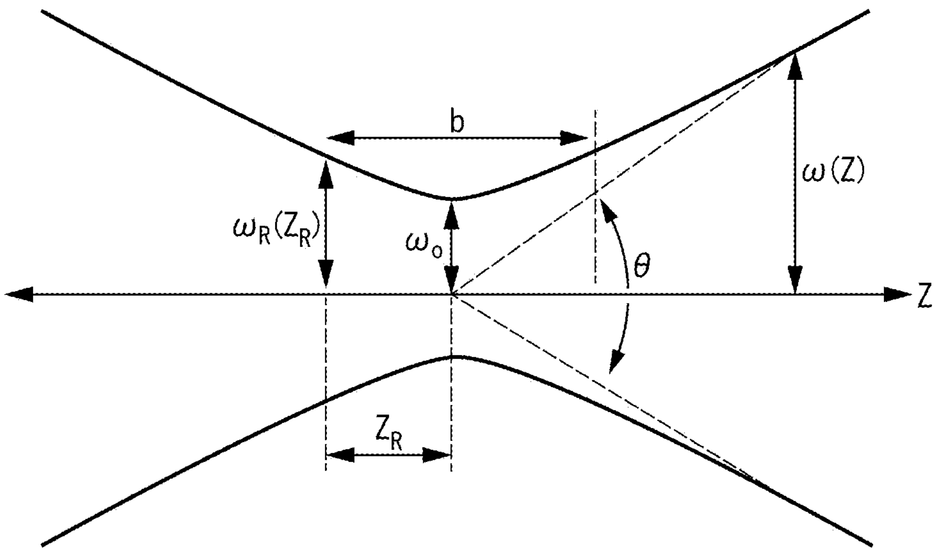
FIG. 10 is a view showing a relationship between a laser beam diameter corresponding to each of Examples and a distance Z from a laser emission surface.

FIG. 10 is an explanatory view of a relationship between a laser beam diameter corresponding to each of Examples and a distance Z from a laser emission surface (corresponding to the gap S in FIGS. 7 and 8) in the case of a Gaussian beam.

The laser beam diameter is defined by the following Expression (2).

[Math. 1]

$$w(z)^2 = w_0^2 + \theta^2 z^2 = w_0^2 + \left(\frac{\lambda}{\pi w_0^2}\right)^2 z^2 \quad (1)$$

$$w(z) = w_0 \sqrt{1 + \left(\frac{\lambda z}{\pi w_0^2}\right)^2} \quad (2)$$

In Expressions (1) and (2), $\omega_0$ indicates the beam waist (a value at which the beam diameter is minimized by diffraction), and Z indicates the distance from the laser light sources (corresponding to the gap S in FIGS. 7 and 8) (refer to FIG. 10). λ indicates the wavelength of laser light.

Table 2 shows the laser beam diameters [μm] of respective rays of RGB laser light when the distance Z from the laser emission surface was 1 μm, 2.5 μm, and 4 μm, respectively when the beam waist @$\omega_0$ was 0.2 μm. The distance Z=1 μm corresponds to Comparative Example 1, the distance Z=2.5 μm corresponds to Examples 1 and 6, and the distance Z=4 μm corresponds to Examples 2 to 5.

TABLE 2

| Distance Z from laser emission surface | R (637 nm) | G (520 nm) | B (455 nm) |
|---|---|---|---|
| 1 μm | 2 μm | 1.7 μm | 1.4 μm |
| 2.5 μm | 5.1 μm | 4.1 μm | 3.6 μm |
| 4 μm | 8.1 μm | 6.6 μm | 5.8 μm |

Examples 1 and 4 to 6 had a constitution in which each ray of laser light incident on the optical coupler from each of the laser light sources was guided to the optical coupling part through two light input side optical waveguides. For this reason, compared to Comparative Example in which each ray of laser light incident on the optical coupler from each of the laser light sources was guided to the optical coupling part through one light input side optical waveguide, in Examples 1 and 4 to 6, since the power density of laser light was dispersed into two light input side optical waveguides while the coupling efficiency with respect to a laser remained the same, deterioration in light input side optical waveguides could be curbed compared to Comparative Example. For this reason, Examples 1 and 4 to 6 were also suitable for optical couplers for high-output lasers.

In addition, Examples 2 and 3 had a constitution in which each ray of laser light incident on the optical coupler from each of the laser light sources was guided to the optical coupling part through three light input side optical waveguides. For this reason, compared to Comparative Example in which each ray of laser light incident on the optical coupler from each of the laser light sources was guided to the optical coupling part through one light input side optical waveguide, in Examples 2 and 3, since the power density of laser light was dispersed into three light input side optical waveguides while the coupling efficiency with respect to a laser remained the same, deterioration in light input side optical waveguides could be curbed compared to Comparative Example. For this reason, Examples 2 and 3 were also suitable for optical couplers for high-output lasers.

In addition, Examples 1, 2, 4, and 5 had a constitution in which two light output ports were provided and light was guided from the optical coupling part to each of the light output ports through two light output side optical waveguides and was output. For this reason, compared to Comparative Example in which one light output port was provided and light was guided to the light output port through one light output side optical waveguide, in Examples 1, 2, 4, and 5, since the power density of laser light was dispersed into two light output side optical waveguides and the light was output, deterioration in light input side optical waveguides could be curbed compared to Comparative Example. For this reason, Examples 1, 2, 4, and 5 were also suitable for optical couplers for high-output lasers.

In addition, Example 3 had a constitution in which three light output ports were provided and light was guided from the optical coupling part to each of the light output ports through three light output side optical waveguides and was output. For this reason, compared to Comparative Example in which one light output port was provided and light was guided to the light output port through one light output side optical waveguide, in Example 3, since the power density of laser light was dispersed into three light output side optical waveguides and the light was output, deterioration in light input side optical waveguides could be curbed compared to Comparative Example. For this reason, Example 3 was also suitable for optical couplers for high-output lasers.

EXPLANATION OF REFERENCES

10 Substrate
20 Optical coupling function layer
30 Visible light laser light source
40 Mach-Zehnder optical modulator
50, 51, 52 Optical coupling part
60-1, 60-2, 60-3 Multimode interference input part
100, 101, 102 Optical coupler
200, 300 Optical coupling member
1000 2000 Visible light source module

What is claimed is:

1. An optical coupler for coupling a plurality of laser light beams having different wavelengths, the optical coupler comprising:

a plurality of one-input multiple-output multimode interference input parts provided for each laser beam of the plurality of laser light beams as a light input part of the laser beams, wherein the optical coupler further comprises:

a light output port configured to allow the plurality of laser light beams to be coupled and emitted therethrough;

a plurality of light input side optical waveguides configured to extend from each of the plurality of one-input multiple-output multimode interference input parts;

a light output side optical waveguide configured to extend from the light output port; and an optical coupling part configured to have the plurality of light input side optical waveguides and the light output side optical waveguide connected thereto.

2. The optical coupler according to claim 1 comprising:

a plurality of light output ports as the light output port, and a plurality of light output side optical waveguides respectively connected to the plurality of light output ports.

3. The optical coupler according to claim 2, wherein in the plurality of light output ports, an interval between light output ports farthest away from each other is 25 μm or smaller.

4. The optical coupler according to claim 1, wherein the optical coupling part is a multimode-interference-type optical coupling part.

5. An optical coupling member comprising:

a substrate configured to be made of a material different from lithium niobate; and an optical coupling function layer configured to be formed on a main surface of the substrate and be constituted of a lithium niobate film, wherein the optical coupler according to claim 1 is formed in the optical coupling function layer.

6. A visible light source module comprising:

the optical coupling member according to claim 5; and a plurality of visible laser light sources configured to emit visible light lasers coupled by the optical coupling member.

7. An optical engine comprising:

the visible light source module according to claim 6; and a light scanning mirror configured to reflect light emitted from the visible light source module at various angles for image display.

8. An optical coupling member with an optical modulation function comprising:

a Mach-Zehnder optical modulator configured to be provided inside the optical coupling function layer of the optical coupling member according to claim 5.

9. A visible light source module comprising:

the optical coupling member with an optical modulation function according to claim 8; and a plurality of visible laser light sources configured to emit visible light lasers coupled by the optical coupling member with an optical modulation function.

10. An optical engine comprising:

the visible light source module according to claim 9; and a light scanning mirror configured to reflect light emitted from the visible light source module at various angles for image display.

* * * * *